United States Patent
Goulanian (10) Patent No.: US 9,182,606 B2
(45) Date of Patent: Nov. 10, 2015

(54) REAR-PROJECTION AUTOSTEREOSCOPIC 3D DISPLAY SYSTEM

(71) Applicant: Emine Goulanian, Richmond (CA)

(72) Inventor: Emine Goulanian, Richmond (CA)

(*) Notice: Subject to any disclaimer, the term of this patent is extended or adjusted under 35 U.S.C. 154(b) by 11 days.

(21) Appl. No.: 14/167,544

(22) Filed: Jan. 29, 2014

(65) Prior Publication Data

US 2015/0212334 A1    Jul. 30, 2015

(51) Int. Cl.
  *H04N 13/04* (2006.01)
  *G02B 27/22* (2006.01)
  *G02B 3/08* (2006.01)
  *G03B 35/18* (2006.01)

(52) U.S. Cl.
  CPC .............. *G02B 27/2214* (2013.01); *G02B 3/08* (2013.01); *G03B 35/18* (2013.01); *H04N 13/0402* (2013.01); *H04N 13/0406* (2013.01); *H04N 13/0447* (2013.01)

(58) Field of Classification Search
  USPC ........... 353/7; 352/61; 349/15; 359/466, 471, 359/462, 458, 463; 348/59
  See application file for complete search history.

(56) References Cited

U.S. PATENT DOCUMENTS

| | | |
|---|---|---|
| 2,198,678 A | 4/1940 | Victor |
| 3,632,866 A | 1/1972 | King |
| 3,932,699 A | 1/1976 | Tripp |
| 4,160,973 A | 7/1979 | Berlin |
| 5,132,839 A | 7/1992 | Travis |
| 5,550,765 A | 8/1996 | Bhattacharya et al. |
| 5,581,378 A | 12/1996 | Kowel et al. |
| 5,703,717 A | 12/1997 | Ezra et al. |
| 5,712,732 A | 1/1998 | Street |
| 5,742,332 A | 4/1998 | Imai et al. |
| 5,745,197 A | 4/1998 | Eng et al. |
| 5,930,037 A | 7/1999 | Imai |
| 6,061,083 A | 5/2000 | Aritake et al. |
| 6,061,179 A | 5/2000 | Inoguchi et al. |
| 6,069,650 A | 5/2000 | Battersby |
| 6,268,881 B1 | 7/2001 | Muramoto |

(Continued)

FOREIGN PATENT DOCUMENTS

| | | |
|---|---|---|
| CA | 2165432 C | 5/2001 |
| DE | 19910157 A1 | 9/1999 |

(Continued)

OTHER PUBLICATIONS

Whearston, "Contributions to the Physiology of Vision," 1838, pp. 371-394, 128, Royal Society of London, London.

(Continued)

*Primary Examiner* — William C Dowling
(74) *Attorney, Agent, or Firm* — Thomas E. Loop (57) ABSTRACT

A rear-projection 3D auto-stereoscopic displays system using time-sequencing approach is configured for forming a plurality of perspective views of 3D images of an object or scene in a field of view. 3D displays system comprises a display component, an optical scanning assembly a sensor and a controller. The optical scanning assembly includes a first lens array, a complex of two (second and third) lens arrays, an optical beam shifting device and an optical projection block. The complex of two lens arrays is used as a screen for the 3D display system. The present invention can be employed especially for a wide range of screen sizes and allows significant reduction or elimination of optical cross-talk, at the same time reducing mechanical complexity of 3D display system.

15 Claims, 4 Drawing Sheets

(56) References Cited

U.S. PATENT DOCUMENTS

| | | | |
|---|---|---|---|
| 6,337,721 B1 | 1/2002 | Hamagishi et al. | |
| 6,476,850 B1 | 11/2002 | Erbey | |
| 6,487,020 B1 | 11/2002 | Favalora | |
| 6,533,420 B1 | 3/2003 | Eichenlaub | |
| 6,552,348 B2 | 4/2003 | Cherry et al. | |
| 6,574,042 B2 | 6/2003 | Allio | |
| 6,744,053 B2 | 6/2004 | Wong et al. | |
| 6,831,678 B1 | 12/2004 | Travis | |
| 6,909,097 B2 | 6/2005 | Schreiner et al. | |
| 6,946,658 B2 | 9/2005 | Tai | |
| 7,038,212 B2 | 5/2006 | Wollenweber et al. | |
| 7,049,600 B2 | 5/2006 | Levin | |
| 7,050,020 B2 | 5/2006 | Uehara et al. | |
| 7,064,895 B2 | 6/2006 | Morishima et al. | |
| 7,864,419 B2* | 1/2011 | Cossairt et al. | 359/446 |
| 7,944,465 B2* | 5/2011 | Goulanian et al. | 348/51 |
| 8,243,127 B2* | 8/2012 | Goulanian et al. | 348/54 |
| 8,284,243 B2* | 10/2012 | Lee et al. | 348/59 |
| 9,055,288 B2* | 6/2015 | Goulanian et al. | 1/1 |
| 9,076,359 B2* | 7/2015 | Zerrouk et al. | 1/1 |
| 2002/0190214 A1 | 12/2002 | Serrano et al. | |
| 2003/0076281 A1 | 4/2003 | Lys et al. | |
| 2004/0189970 A1 | 9/2004 | Takada | |
| 2005/0270645 A1 | 12/2005 | Cossairt et al. | |
| 2005/0285997 A1 | 12/2005 | Koyama et al. | |
| 2006/0087449 A1 | 4/2006 | Radzinski | |
| 2006/0092158 A1 | 5/2006 | Shestak | |
| 2006/0114415 A1 | 6/2006 | Shestak et al. | |
| 2006/0176557 A1 | 8/2006 | Travis et al. | |
| 2006/0202910 A1 | 9/2006 | Cha et al. | |
| 2006/0244958 A1 | 11/2006 | Furman et al. | |
| 2007/0008617 A1 | 1/2007 | Shestak et al. | |
| 2007/0008619 A1 | 1/2007 | Cha et al. | |
| 2007/0008620 A1 | 1/2007 | Shestak et al. | |
| 2007/0019856 A1 | 1/2007 | Furman et al. | |
| 2011/0216171 A1 | 9/2011 | Barre et al. | |
| 2011/0285968 A1* | 11/2011 | Huang | 353/31 |
| 2014/0028807 A1* | 1/2014 | Goulanian et al. | 348/51 |

FOREIGN PATENT DOCUMENTS

| | | |
|---|---|---|
| EP | 1221817 A1 | 7/2002 |
| EP | 1394593 A1 | 6/2010 |
| WO | 2005008314 A1 | 1/2005 |
| WO | 2007003792 A1 | 1/2007 |

OTHER PUBLICATIONS

Lizuka, "Using Cellophane to Convert a Liquid Crystal Display Screen into a Three-dimensional Display (3D Laptop Computer and 3D Camera Phone)," 2006, Canada.

Whearston, "On Some Remarkable, and hitherto Unobserved, Phenomena of Binocular Vision," Philosophical Transactions of the Royal Society London, 1838, London, England.

Benton, "Autostereoscope Becomes Holography: Historical Connections," Selected Papers on Three-Dimensional Displays, SPIE Milestone Series, 2000, pp. 154-167, vol. MS 162, Boston, MA, US.

* cited by examiner

First lens array — Intermediary Optical Assembly — Collimating (Fresnel) Lens — Second lens array

Fig. 1. Prior art.

Third lens array — Second lens array — First lens array — Display surface — Driver

REAR-PROJECTION AUTOSTEREOSCOPIC 3D DISPLAY SYSTEM

TECHNICAL FIELD

The present invention relates to three-dimensional (3D) auto-stereoscopic displays using time-sequencing approach and, in particular, to 3D auto stereoscopic projection display systems using at least two lens arrays and providing multiple perspective views to form 3D image in the field of view.

BACKGROUND OF THE INVENTION

There are two main classes of 3D auto-stereoscopic displays based on different approaches: "space multiplexing (sharing)" and "time sequencing (sharing)".

The main disadvantage of 3D auto-stereoscopic displays using space-sharing approach is that the resolution of the 3D image is reduced with increasing the number of perspective views forming the 3D image in the field of view. This results in 3D image quality degradation and restriction of its viewing angle.

Unlike space-sharing displays, 3D auto-stereoscopic time-sequencing display systems reproduce 3D image with resolution that doesn't depend on the number of perspective views. This allows widening 3D image viewing angle by increasing the number of perspective views without reducing resolution of the 3D image.

There are several projection 3D display systems known in the prior art that embody the time-sequencing approach and use at least two lens matrices (arrays), for example, the ones described in U.S. Pat. No. 7,944,465 B2 and U.S. Pat. No. 8,243,127 B2 and US Patent Application US 2005/0270645.

US Patent Application US 2005/0270645 describes a 3D display apparatus comprising a display component for generating a sequence of 2-dimensional (2D) images and an image scanning assembly consisting of a first lens matrix (array), a second lens matrix (array) optically coupled to the first lens matrix (array) via intermediary optical assembly.

The peculiarity of this scanning assembly consists in that the first lens array can be made significantly smaller than the second array, if the intermediary optical assembly is a magnification system. This allows shifting the first lens array for scanning images instead of shifting the second array that can be made much larger and thereby significantly reduce the mechanical complexity of the scanning operation and provide more compact 3D display systems. This is much more suitable for 3D display systems with large screens.

However, this advantage is achieved at the expense of increased cross-talk. There are two sources of cross-talk in the image scanning assembly described in US Patent Application US 2005/0270645. One of them (the first source) is associated with shifting the structure of optical beams at the second lens array (shown FIG. 1, Prior Art) relative to the structure of the second lens array during the scanning operation. The second source of cross-talk is associated with a mismatch between the structure of 2D images at the first lens array shifting during the scanning operation and the structure of this array.

It is worth noting that the level of cross-talk for both sources grows with the amplitude of the displacement of the first lens array, resulting in 3D image quality degradation and restriction of its viewing angle.

It should be noted that the second source of cross-talk could be eliminated if the first lens array is displaced together with the display component. But, the associated mechanical complexity may effectively cancel the advantage of using a small-size first lens array. Therefore, it is necessary to find another solution for this cross-talk problem.

The said crosstalk problems can be partially solved by using the solution describing 3D display systems disclosed in the prior art (U.S. Pat. No. 7,944,465 B2 and U.S. Pat. No. 8,243,127 B2). Each of these systems comprises a display component for generating a sequence of 2-dimensional (2D) images, an image scanning assembly consisting of a first lens matrix (array) and a complex of two (second and third) lens matrices (arrays), and a mechanism for transversely moving the first matrix or the complex of matrices relative to each other to provide the scanning operation.

In fact, the use of three lens arrays significantly reduces the level of cross-talk related to the said first source of cross-talk, thus allowing better quality of the 3D image and wider viewing angles. This is provided by the fact that during the scanning operation an optical beam passing through each lens of the second lens array is directed by the said lens to the respective lens of the third lens array within the aperture of the latter lens.

Meanwhile, the said second source of cross-talk is inherent in both 3D display systems disclosed in the respective versions of U.S. Pat. No. 7,944,465 B2 and U.S. Pat. No. 8,243,127 B2 associated with the movement of the first matrix and in those of US 2005/0270645. This prevents further improvement of the quality of the 3D image and widening of its viewing angle.

Besides, the possibility of using the solution disclosed in U.S. Pat. No. 7,944,465 B2 and U.S. Pat. No. 8,243,127 B2 for implementation of large-screen 3D display systems is restricted because of higher mechanical complexity of the scanning apparatus.

It should be noted that implementation of large-screen 3D display systems based on both the solution disclosed in U.S. Pat. No. 7,944,465 B2 and U.S. Pat. No. 8,243,127 B2 and the solution disclosed in US 2005/0270645 is unfeasible without reducing the level of cross-talk mentioned above.

Therefore, it is necessary to find another solution for implementation of large-screen 3D display to solve prior art problems related to cross-talk and to the mechanical complexity of the scanning operation.

SUMMARY OF THE INVENTION

The general object of the present invention is to propose a rear-projection large-screen 3D display system having higher 3D image quality and enlarged 3D image viewing angle by significantly reducing or eliminating cross-talk associated with the scanning operation and thereby to solve problems of the related prior art.

Another object of the present invention is to reduce mechanical complexity of the scanning assembly and that of the rear-projection 3D display system as a whole.

Yet another object of the present invention is to propose a rear-projection 3D display system suitable for wide range of screen sizes.

The main idea of the present invention consists in that the scanning operation is accomplished without moving lens arrays forming 3D image. Instead, a special optical device is provided for transversal shifting of optical beams propagating between the lens arrays. And, apart from this, an optical projection block is provided for matching the structure of optical beams passing through the said special optical device and the structure of the lens arrays.

This allows a significant reduction or elimination of cross-talk associated with the scanning operation.

In particular, the use of stationary lens arrays allows matching between the structure of optical beams emanating from the display surface and the structure of the first lens array and thereby significantly reducing or eliminating the cross-talk level associated with the said second source of cross-talk.

Whereas, the usage of the complex of two (second and third) lens arrays (similar to that disclosed in U.S. Pat. No. 7,944,465 B2 and U.S. Pat. No. 8,243,127 B2) and focusing optical beams on the second lens array allows significant reduction or elimination of the cross-talk levels associated with the said first source of cross-talk.

The main idea enables also achieving another object of the present invention. Thus, the special optical device, the first lens array, and display component can be made significantly smaller than the complex of two (second and third) lens arrays. In this case, the level of mechanical complexity of the scanning assembly and 3D display system as a whole will be much more acceptable for implementation of large-screen 3D display systems and, what is most important, without at the same time increasing the level of cross-talk.

The invention is defined by the independent claim. The dependent claims provide advantageous embodiments.

According to the present invention, there is provided a rear-projection autostereoscopic 3D display system configured for forming a plurality of perspective views of 3D images of an object or scene in a field of view. The 3D display system comprises: a display component for generating a sequence of 2-dimensional (2D) images, an optical scanning assembly for transforming optical beams emanating from each 2D image on the displaying surface and sending transformed optical beams in the direction of the corresponding perspective view in the field of view, a sensor, and a controller.

The display component includes a display surface for displaying 2D images, a data input for updating 2D images, and a synchronization input.

The optical scanning assembly includes a first lens array and a complex of two (a second and a third) converging lens arrays, an optical beam shifting device, and an optical projection block. All lens arrays and the optical projection block remain stationary with respect to each other and to the display component, and each lens of the first lens array is optically coupled to one respective area of the display surface along a respective optical axis. Whereas in the complex of lens arrays each lens of the second lens array is optically coupled to one respective lens of the first lens array through the optical projection block and the optical beam shifting device, and each lens of the third lens array is optically coupled to one respective lens of the second lens array and disposed in the focal region of the said lens of the second lens array. The optical beam shifting device includes an optical component for shifting optical beams passing therethrough and a driver having a control input. The optical projection block is configured for focusing optical beams onto the respective lenses of the second lens array and sending them further through the respective lenses of the third lens array as the said transformed optical beams of the corresponding perspective view.

The sensor is configured for sensing the position of shifted optical beams and has a synchrosignal output.

The controller is configured for controlling the scanning parameters and synchronisation of 2D images displayed on the display surface with the position of shifted optical beams and has a synchrosignal input connected to the synchrosignal output of the sensor, a synchronization output connected to the synchronization input of the display component, and a control output connected to the control input of the driver of the optical beam shifting device.

These and other embodiments of the present invention will become more evident upon reference to the following detailed description and attached drawings. It is to be understood, however, that various changes, alterations, and substitutions may be made to the specific embodiments disclosed herein without departing from their essential spirit and scope.

BRIEF DESCRIPTION OF THE DRAWINGS

The drawings are intended to be illustrative and symbolic representations of certain preferred and exemplary embodiments of the present invention and as such, they are not necessarily drawn to scale. Reference numerals and symbols are used to designate specific features that are schematically shown and described.

DETAILED DESCRIPTION OF THE PREFERRED EMBODIMENTS

Figure 1:
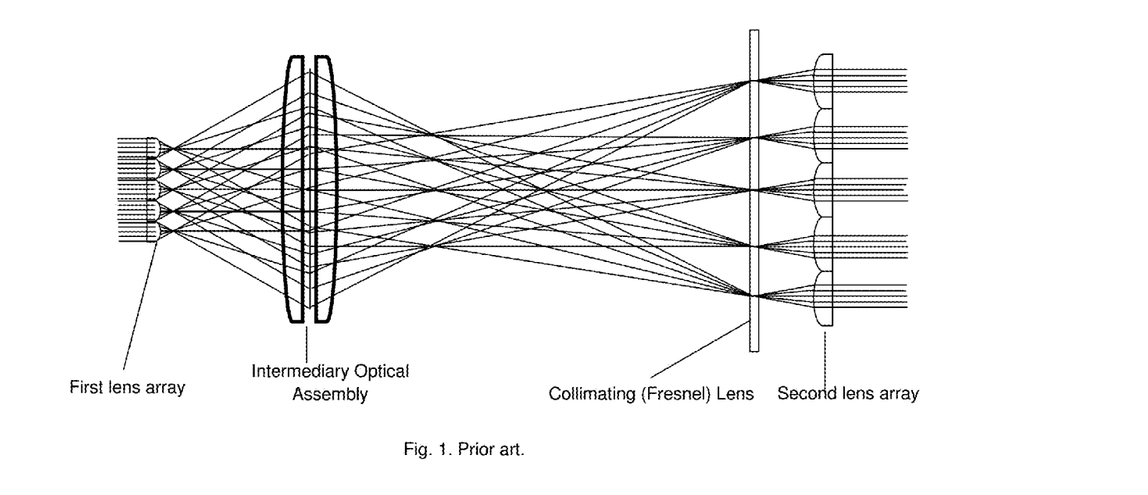
FIG. 1 is a schematic representation (prior art) of an image scanning assembly disclosed in US 2005/0270645.

FIG. 1 illustrates the structure of the image scanning assembly disclosed in US 2005/0270645 (prior art) and the paths of optical beams in this assembly. The peculiarity of this scanning assembly consists in that the first lens array can be made significantly smaller than the second lens array, if the intermediary optical assembly is a magnification assembly. This allows shifting the first lens array for scanning images instead of shifting the second lens array and thereby significant reduction of the mechanical complexity of the scanning operation and makes 3D display systems more compact. This is much more suitable for large-screen 3D display systems.

However, this advantage is achieved at the expense of increased optical cross-talk. There are two sources of cross-talk in the image scanning assembly described in US Patent Application US 2005/0270645. One of them is associated with shifting the structure of optical beams at the second lens array (shown FIG. 1, Prior Art) and the structure of this array during the scanning operation. The second source of cross-talk is associated with a mismatch between the structure of 2D images at the first lens array and the structure of this array during the scanning operation.

In most applications of 3D display systems it is necessary to have a large number of perspective views and a wide viewing angle. However, this usually requires a high amplitude of lens array shifting. The level of cross-talk for both sources in this structure grows with the shift amplitude and so, this structure is not suitable for such applications.

Figure 2:
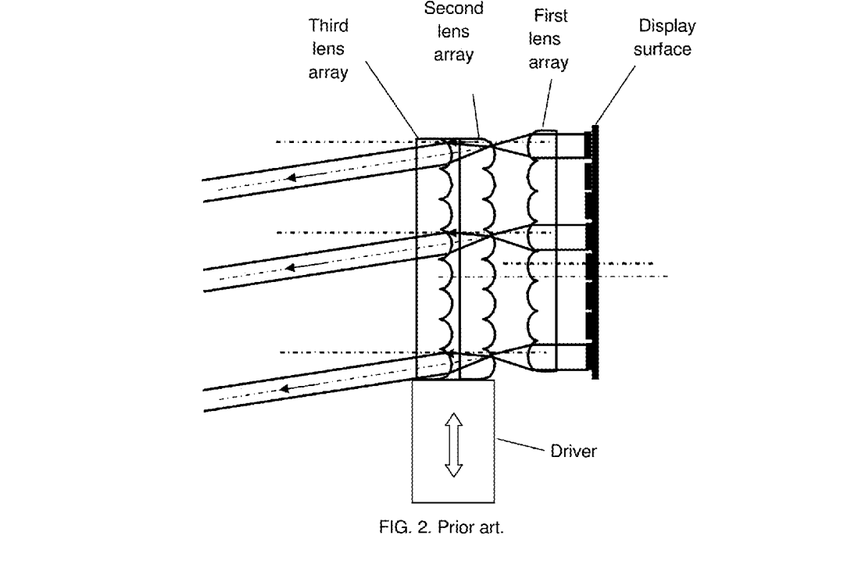
FIG. 2 is a schematic representation (prior art) of an optical imaging system disclosed in U.S. Pat. No. 7,944,465 B2.

The said first source of cross-talk problems can be solved by implementing the solution describing the structure of the optical imaging system disclosed in U.S. Pat. No. 7,944,465

B2 (see FIG. 2, Prior Art). This can be provided by using a complex of two (second and third) lens arrays.

Meanwhile, the problem associated with the second source of cross-talk is inherent both in 3D display systems versions of U.S. Pat. No. 7,944,465 B2 and in those of US 2005/0270645. This prevents from further improvement in quality of the 3D image and its viewing angle.

Figure 3:
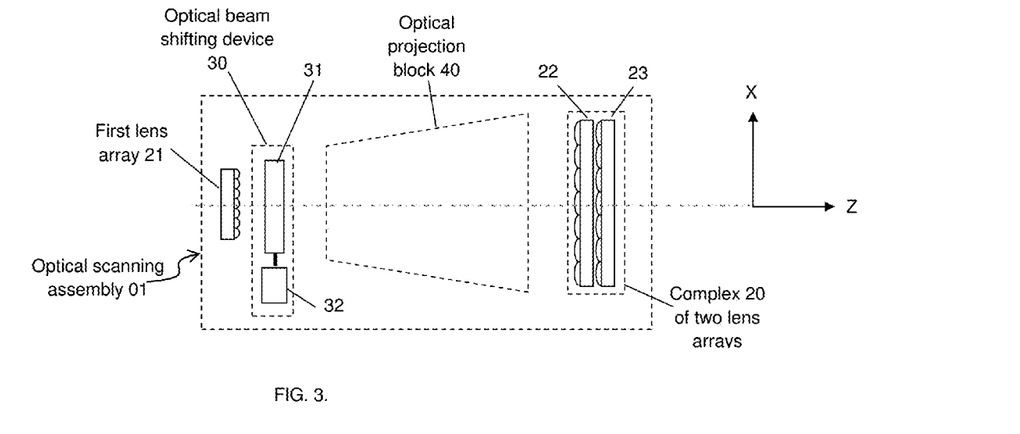
FIG. 3 is a schematic representation of the structure of an optical scanning assembly of a rear-projection autostereoscopic 3D display system according to the present invention.

FIG. 3 illustrates the structure of the optical scanning assembly embodying the main idea of the present invention. The optical scanning assembly 01 comprises first lens array 21 and complex 20 of two (second 22 and third 23) converging lens arrays, optical beam shifting device 30 including optical component 31 for shifting optical beams and driver 32 and optical projection block 40. The peculiarity of the invented optical scanning assembly consists in that all lens arrays and the optical projection block are disposed stationary with respect to each other. Instead, optical beam shifting device is used to provide the scanning operation.

FIG. 3 and the subsequent figures have designations of the orthogonal coordinate system, wherein X axis is oriented in the horizontal direction, Y axis—in the vertical direction and Z axis defines the axis of the optical scanning assembly.

To a full extent the advantages of embodying the main idea of the present invention are provided in the invented rear-projection autostereoscopic 3D display system. The schematic representation of this 3D display system is shown on FIG. 4. The 3D display system is configured for forming a plurality of perspective views of 3D images of an object or scene in a field of view and comprises the display component, the optical scanning assembly, the sensor, and the controller.

Figure 4:
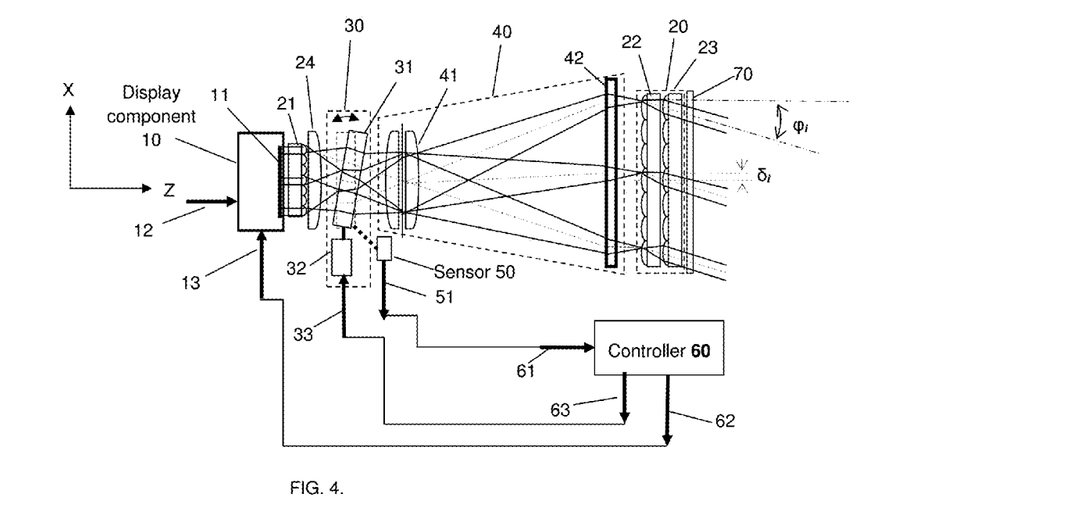
FIG. 4 is a schematic representation of the structure of a rear-projection autostereoscopic 3D display system according to the present invention.

The display component 10 is configured for generating a sequence of 2D images and has display surface 11 for displaying 2D images, data input 12 for updating 2D images, and synchronization input 13.

The optical scanning assembly is configured for transforming optical beams emanating from each 2D image on displaying surface 11 and sending transformed optical beams in the direction of the corresponding perspective view in the field of view. The optical scanning assembly comprises first lens array 21 and complex 20 of two (second 22 and third 23) converging lens arrays, optical beam shifting device 30 including optical component 31 for shifting optical beams and driver 32 and optical projection block 40, wherein lens arrays 21, 22, and 23, and optical projection block 40 are disposed stationary with respect to each other and to display component 10.

Each lens of first lens array 21 is made converging or concave and optically coupled to one respective area of display surface 11 along a respective optical axis (not shown). Whereas in complex 20 each lens of second lens array 22 is optically coupled to one respective lens of first lens array 21 through optical projection block 40 and optical component 31 of optical beam shifting device 30, and each lens of third lens array 23 is optically coupled to one respective lens of second lens array 22 and disposed in the focal region of said lens of second lens array 22. In some cases, field lens 24 can be used to improve homogeneity of the optical beam intensity distribution over the input aperture of optical projection block 40, thereby improving homogeneity of the 3D image intensity distribution.

Optical beam shifting device 30 includes optical component 31 for shifting optical beams passing therethrough and driver 32 having control input 33. Optical component 31 is disposed between first lens array 21 and optical projection block 40.

Optical projection block 40 is configured for focusing optical beams onto the respective lenses of second lens array 22 and sending further through the respective lenses of third lens array 23 as transformed optical beams of the corresponding perspective view. Optical projection block 40 includes disposed coaxially projection lens 41 and collimating lens 42, wherein collimating lens 42 is faced toward and disposed close to second lens array 22. In particular, collimating lens 42 can be a Fresnel lens.

Sensor 50 is configured for sensing the position of shifted optical beams and has synchrosignal output 51. Different types of sensors known in the prior art can be used. For example, sensor 50 sensing the movement (e.g., tilt, shift, rotation) of optical component 31 can be used.

Controller 60 is configured for controlling scanning parameters and the synchronisation of 2D images displayed on the display surface 11 with the position of shifted optical beams, wherein the synchronisation is based on synchrosignal received from synchrosignal output 51 of sensor 50.

Controller 60 has synchrosignal input 61 connected to synchrosignal output 51 of sensor 50, synchronization output 62 connected to synchronization input 13 of display component 10, and control output 63 connected to control input 33 of driver 32 of optical beam shifting device 30.

Vertical diffuser 70 can be disposed at the output of the optical scanning assembly (close to third lens array 23) for increasing the viewing angle in the vertical direction.

It is worth noting that the present invention allows reducing mechanical complexity of the optical scanning assembly and that of the 3D display system as a whole (see FIG. 4), if optical beam shifting device 30, first lens array 21, and display component 10 are made significantly smaller than complex 20 of two (second 22 and third 23) lens arrays. The ratio of the pitches of lenses of first lens array 21 and second lens array 22 should correspond to magnification of optical projection block 40. In this case, the scanning assembly and 3D display system will be much suitable for implementation of large-screen 3D display systems and, what is most important, without increasing the cross-talk level.

When the 3D display system is used for providing 3D images with horizontal parallax first 21, second 22, and third 23 lens arrays are made as respective the first, second, and third lenticular arrays oriented vertically.

FIGS. 3-8 have designation, wherein the X axis is oriented in the horizontal direction, Y axis—in the vertical direction, and the Z axis defines the axis of the optical scanning assembly in an orthogonal coordinate system.

Figure 5:
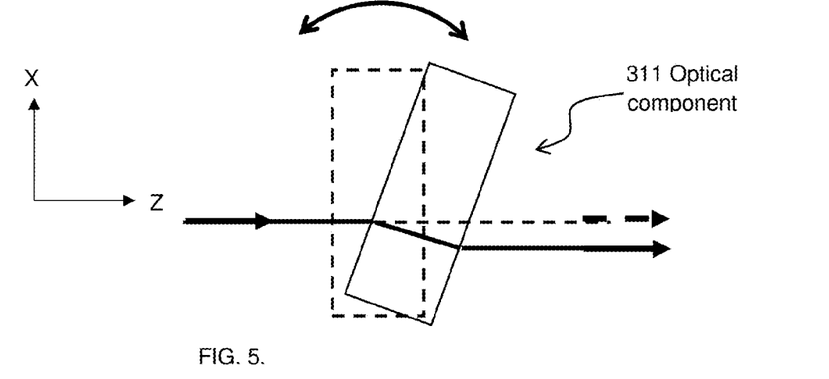
FIG. 5 is a schematic view of an implementation of the optical component of the optical beam shifting device.

FIG. 5 shows version 311 of optical component 31 that is made as a transparent flat plate disposed vertically with the possibility of tilting relative to the vertical axis.

Figure 6:
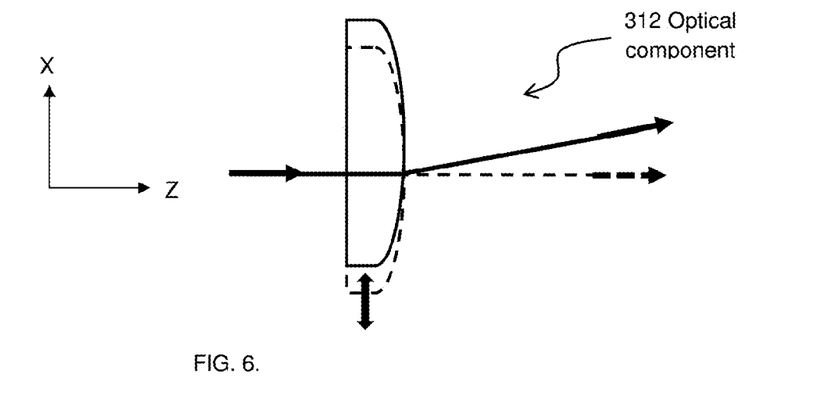
FIG. 6 is a schematic view of an implementation of the optical component of the optical beam shifting device.

FIG. 6 shows another version 312 of optical component 31 that is made as a field lens disposed with the possibility of horizontal shift.

Figure 7:
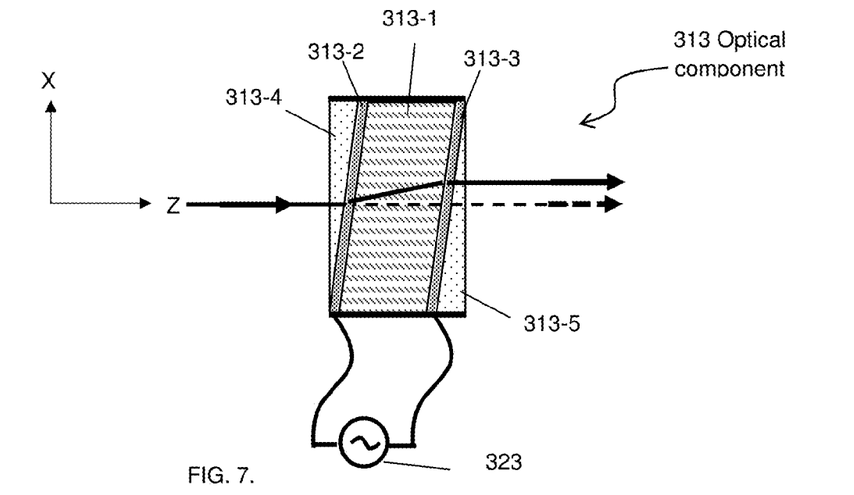
FIG. 7 is a schematic view of an implementation of the optical component of the optical beam shifting device.

Optical component 31 in version 313 shown in FIG. 7 is made as electro-optical cell 313-1 having flat back sides parallel each other and coated with transparent electrodes 313-2, 313-3. Cell 313-1 is disposed between two identical optical wedges 313-4, 313-5 placed perpendicular to the optical axis of optical projection block 40 and oriented horizontally in opposite directions.

Figure 8:
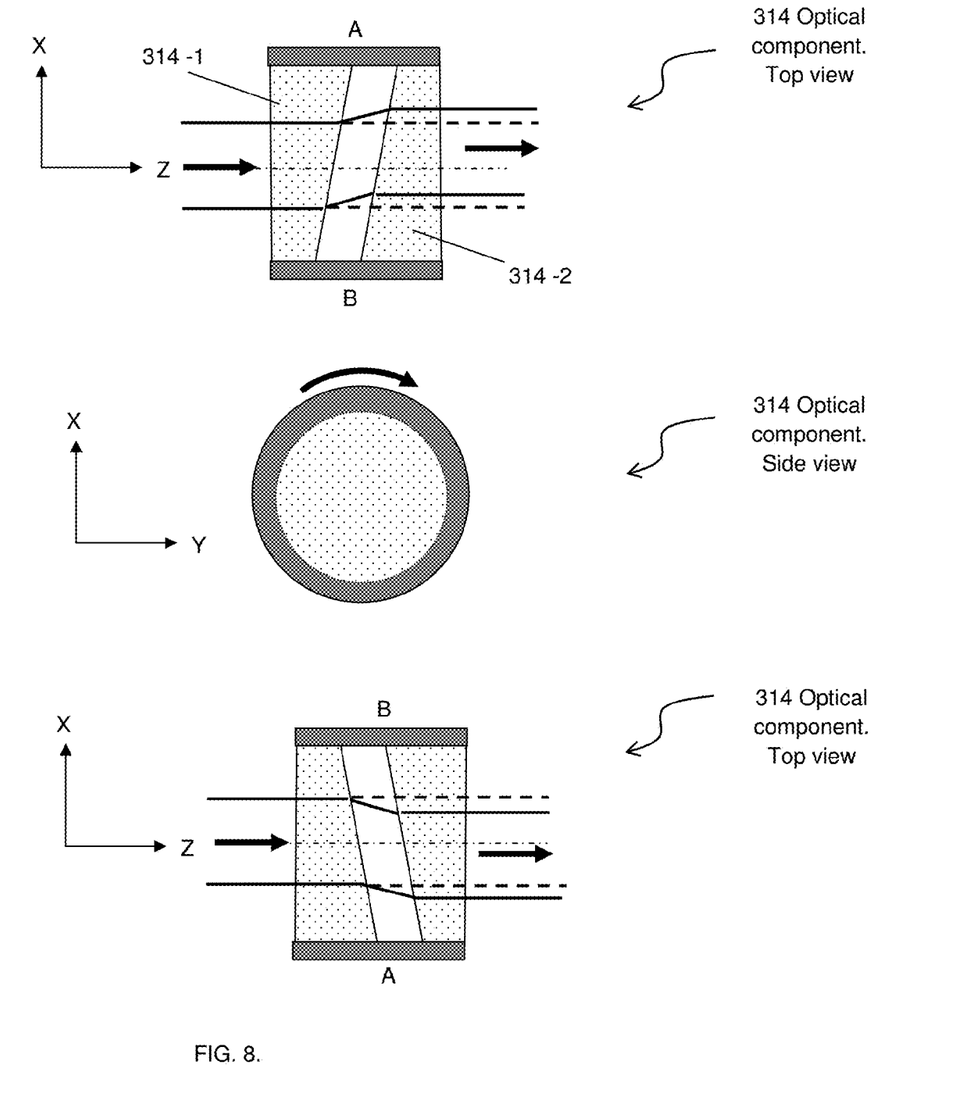
FIG. 8 is a schematic view of an implementation of the optical component of the optical beam shifting device.

Optical component 31 in version 314 shown in FIG. 8 consists of two identical optical wedges 314-1, 314-2 disposed in opposite directions perpendicular to and with a gap along the optical axis of optical projection block 40 with the possibility of rotation around this axis.

A rear-projection autostereoscopic 3D display system operates as follows (see FIGS. 3 and 4). Display component 10 generates a sequence of 2D images to be displayed on displaying surface 11. Optical beams emanating from each 2D image on displaying surface 11 are transformed by optical scanning assembly 01 to be sent in the direction of the corresponding perspective view in the field of view. Because first lens array 21 is disposed stationary with respect to display component 10, the structure of optical beams emanating from display surface 11 matches with the structure of first lens array 21 during the scanning operation. Thereby, the level of cross-talk associated with the said second source of cross-talk is significantly reduced or eliminated.

Optical beams passing through first lens array 21 and optical component 31 are focused by optical projection block 40 on the respective lenses of second lens array 22 and pass further through the respective lenses of third lens array 23. Third lens array 23 is optically coupled with respective lenses of second lens array 22 and disposed in the focal region of said lenses of second lens array 22. During the scanning operation, the focal point of an optical beam passing through each lens of second lens array 22 is shifted within the aperture of the said lens. As a result, the optical beam passing through the respective lens of third lens array 23 is contained within the aperture of the latter lens. This allows matching the structure of these optical beams and the structure of complex 20 during the scanning operation. Therefore, cross-talk associated with the said first source of cross-talk is significantly reduced or eliminated and thereby quality of the 3D image and its viewing angle are improved.

Optical beams guided by optical projection block 40 through the respective lenses of third lens array 23 pass further as the said transformed optical beams of the corresponding perspective view.

To provide the scanning operation, optical component 31 of optical beam shifting device 30 carries out transversal shifting of optical beams propagating between first lens array 21 and complex second lens array 22 and third 23 lens arrays.

Sensor 50 is used for sensing the position of optical beams shifted by optical component 31 of optical beam shifting device 30 and forming the synchrosignal at synchrosignal output 51. This synchrosignal is directed to synchrosignal input 61 of controller 60 for synchronisation of 2D images displayed on the display surface 11 with the position of shifted optical beams. The synchronisation is accomplished through synchronization output 62 of controller 60 and synchronization input 13 of display component 10.

Optical beam shifting device 30 provides reciprocative shifting of optical beams to carry out the scanning operation of the 3D display system. Working parameters of (e.g., amplitude and period of optical beam shifting) are controlled by controller 60 through control output 63 and control input 33 of driver 32 of optical beam shifting device 30. This allows controlling parameters of the scanning operation (the number perspective views, the viewing angle, the scanning period, etc.).

Thus, optical beam shifting by amount $\delta_i$ corresponds to perspective view i in the direction shown by angle $\phi_i$ (see FIG. 4).

The present invention allows various versions of implementation of optical component 31 of optical beam shifting device 30, which are illustrated in FIGS. 5-8.

Optical component 31 of version 311 (FIG. 5) is made as a transparent flat plate disposed vertically with the possibility of tilting relative to the vertical axis. Driver 32 of optical beam shifting device 30 provides the said tilting (designated by curved arrows) of optical component 31 in accordance with the control signal from controller 60 through control output 63 and control input 33 of driver 32.

Optical component 31 of version 312 (FIG. 6) is made as a field lens disposed with the possibility of shifting the field lens horizontally. Driver 32 of optical beam shifting device 30 provides reciprocating shifting of the field lens in accordance with the control signal from controller 60 through control output 63 and control input 33 of driver 32. As a result, optical beams at second lens array 22 are shifted.

Optical component 31 in version 313 shown in FIG. 7 is made as electro-optical cell 313-1 having flat back sides parallel to each other and coated with transparent electrodes 313-2, 313-3. Driver 32 of optical beam shifting device 30 receives the control signal from controller 60 through control output 63 and control input 33 of driver 32 and applies electric voltage to transparent electrodes 313-2, 313-3 of electro-optical cell 313-1.

Optical component 31 in version 314 shown in FIG. 8 consists of two identical optical wedges 314-1, 314-2 disposed in opposite directions perpendicular to and with a gap along the optical axis of optical projection block 40 with the possibility of rotation around this axis. Driver 32 of optical beam shifting device 30 provides the said rotation (shown with a curved arrow) of optical component 31 in accordance with the control signal from controller 60 through control output 63 and control input 33 of driver 32. As a result, optical beams at second lens array 22 are shifted. Letters A and B designate opposite sides of optical component 31 in version 314.

While the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. It will be apparent to those skilled in the art that various modifications and variations can be made to the rear-projection auto stereoscopic 3D display system without departing from the spirit or scope of the invention as it is described in the appended claims.

What is claimed is:

1. A rear-projection autostereoscopic three-dimensional (3D) display system for forming a plurality of perspective views of 3D images of an object or scene in a field of view, comprising:

a display component for generating a sequence of 2-dimensional (2D) images, the display component having a display surface for displaying 2D images, a data input for updating 2D images, and a synchronization input;

an optical scanning assembly for transforming optical beams emanating from each 2D image on the displaying surface and sending transformed optical beams in the direction of the corresponding perspective view in the field of view, the optical scanning assembly including: a first lens array and a complex of two (a second and a third) converging lens arrays, an optical beam shifting device and an optical projection block, wherein all lens arrays and the optical projection block being disposed stationary with respect to each other and the display component, and wherein each lens of the first lens array being optically coupled to one respective area of the display surface along a respective optical axis;

whereas in the complex of lens arrays each lens of the second lens array being optically coupled to one respective lens of the first lens array through the optical projection block and the optical beam shifting device, and each lens of the third lens array being optically coupled to one respective lens of the second lens array and disposed in the focal region of said lens of the second lens array;

the optical beam shifting device including: an optical component for shifting optical beams passing therethrough and a driver having a control input;

the optical projection block being configured for focusing optical beams onto the respective lenses of the second lens array and sending further through the respective lenses of the third lens array as the said transformed optical beams of the corresponding perspective view;

a sensor configured for sensing the position of shifted optical beams, the sensor having a synchrosignal output; and a controller configured for controlling scanning parameters and synchronisation of 2D images displayed on the display surface with the position of shifted optical beams, the controller having a synchrosignal input being connected to the synchrosignal output of the sensor, a synchronization output being connected to the synchronization input of the display component, and a control output being connected to the control input of the driver of the optical beam shifting device.

2. The rear-projection 3D display system of claim 1 wherein the size of the first lens array is different from the size of the second array and the ratio of the pitches of lenses of these arrays corresponds to magnification of the optical projection block.

3. The rear-projection 3D display system of claim 2 wherein the first lens array is made smaller than the second array.

4. The rear-projection 3D display system of claim 1 wherein lenses of the first lens array are converging or concave.

5. The rear-projection 3D display system of claim 1 wherein the first, second, and third lens arrays are respectively the first, second, and third lenticular arrays oriented vertically.

6. The rear-projection 3D display system of claim 5 wherein the optical scanning assembly includes additionally a vertical diffuser disposed close to the complex of lens arrays.

7. The rear-projection 3D display system of claim 1 wherein the optical scanning assembly includes additionally a field lens disposed between the optical beam shifting device and the first lens array close to the latter.

8. The rear-projection 3D display system of claim 1 wherein the optical component of the optical beam shifting device is made as a transparent flat plate disposed perpendicular to the horizontal plane with the possibility of tilting relative to the vertical axis.

9. The rear-projection 3D display system of claim 1 wherein the optical component of the optical beam shifting device is made as a transparent flat plate inclined to the optical axis of the optical projection block with possibility of the rotation around this axis;

10. The rear-projection 3D display system of claim 1 wherein the optical component of the optical beam shifting device consists of two identical optical wedges disposed in opposite directions perpendicular to and with a gap along the optical axis of the optical projection block with the possibility of the rotation around this axis.

11. The rear-projection 3D display system of claim 1 wherein the optical component of the optical beam shifting device is made as a cell of the electro-optical material, the cell being disposed in the vertical plane, inclined to the optical axis of the optical projection block and provided with transparent electrodes.

12. The rear-projection 3D display system of claim 1 wherein the optical component is disposed between the first lens array and the optical projection block.

13. The rear-projection 3D display system of claim 1 wherein the optical component of the optical beam shifting device is made as a field lens disposed with possibility of horizontal shift.

14. The rear-projection 3D display system of claim 1 wherein the optical projection block includes a projection lens and a collimating lens disposed coaxially, wherein the collimating lens is faced toward and disposed close to the second lens array.

15. The rear-projection 3D display system of claim 14 wherein the collimating lens is a Fresnel lens.

* * * * *